(12) United States Patent
Lubbers et al.

(10) Patent No.: US 8,656,943 B2
(45) Date of Patent: Feb. 25, 2014

(54) LIQUID APPLIANCE AND TRANSPORT LOCK

(75) Inventors: Matthijs Hendrikus Lubbers, Drachten (NL); Marc Alexander Pastoors, Hoogeveen (NL); Jasper Nicolaas Ten Berge, Hoogeveen (NL); Henk Uil, Hoogeveen (NL)

(73) Assignee: Koninklijke Philips N.V., Eindhoven (NL)

(*) Notice: Subject to any disclaimer, the term of this patent is extended or adjusted under 35 U.S.C. 154(b) by 252 days.

(21) Appl. No.: 13/063,580

(22) PCT Filed: Sep. 15, 2009

(86) PCT No.: PCT/IB2009/054023
§ 371 (c)(1),
(2), (4) Date: Mar. 11, 2011

(87) PCT Pub. No.: WO2010/032196
PCT Pub. Date: Mar. 25, 2010

(65) Prior Publication Data
US 2011/0163123 A1 Jul. 7, 2011

(51) Int. Cl.
*F16K 31/18* (2006.01)
(52) U.S. Cl.
USPC .............. 137/434; 137/316; 137/409
(58) Field of Classification Search
USPC ............ 137/316, 360, 383, 385, 409, 434; 251/89, 90, 95, 98, 96; 70/175, 176, 70/174; 222/67
See application file for complete search history.

(56) References Cited

U.S. PATENT DOCUMENTS

| 232,527 | A | * | 9/1880 | Marchand | ............. 222/27 |
| 664,462 | A | * | 12/1900 | Campbell | ............. 137/385 |
| 2,181,729 | A | * | 11/1939 | Harris et al. | ............. 137/174 |
| 2,427,059 | A | | 9/1947 | Landon | |
| 2,674,475 | A | | 4/1954 | Kmiecik et al. | |
| 2,790,457 | A | * | 4/1957 | Millerwise | ............. 137/316 |
| 3,020,923 | A | | 2/1962 | Johnson et al. | |
| 5,272,856 | A | * | 12/1993 | Pharo | ............. 53/472 |
| 6,837,264 | B1 | | 1/2005 | Schuster | |
| 7,926,511 | B1 | * | 4/2011 | Schuster et al. | ............. 137/434 |
| 8,333,215 | B1 | * | 12/2012 | Schuster et al. | ............. 137/434 |

FOREIGN PATENT DOCUMENTS

GB 0886837 1/1962

* cited by examiner

*Primary Examiner* — Craig Schneider
*Assistant Examiner* — Craig J Price (57) ABSTRACT

A liquid appliance (1) has a liquid reservoir (20), a liquid inlet (24) for supplying liquid to the liquid reservoir (20), a float system (3) provided with a float (2) and a valve system (5). A transport lock (8) switchable between a first position in which the transport lock (8) blocks the float system (3) relative to the liquid reservoir (20), and a second position in which a cooperation between the float (2) and the valve system (5) for opening and closure of the liquid inlet (24) is unimpeded by the transport lock (8). The transport lock (8) is switchable between said first and second positions by an installation prevention element (12). The element (12) can be switched to a prevention position, wherein installation of the appliance into an operational position is impeded by the element (12). In the prevention position the first position of the transport lock (8) is established. The element (12) can also be switched to an installation position, wherein installation of the appliance (1) into an operational position is unimpeded by the element (12). In the installation position the second position of the transport lock (8) is established.

7 Claims, 5 Drawing Sheets

LIQUID APPLIANCE AND TRANSPORT LOCK

FIELD OF THE INVENTION

The invention relates to liquid appliance, particularly a water appliance, having a liquid reservoir, a liquid inlet for supplying liquid to the liquid reservoir, a float system having a float and a valve system, a transport lock switchable between a first position in which the transport lock blocks the float system relative to the liquid reservoir, and a second position in which a cooperation between the float and the valve system for opening and closure of the liquid inlet is unimpeded by the transport lock.

The invention also relates to a transport lock for use in a liquid appliance, a installation prevention element for use in a liquid appliance, a float system for use in a liquid appliance and to packaging material for a water appliance.

BACKGROUND OF THE INVENTION

A liquid appliance of the above mentioned kind is generally known.

Such an appliance makes use of a liquid reservoir that is connected via a liquid inlet to a liquid supply system, such as a public water system or a liquid processing unit which may for example be comprised by the liquid appliance. Examples of such a processing unit are a filter unit and a disinfection unit for irradiation of water. For filling of the reservoir up to a desired level of liquid the appliance has a float system which is responsive to a level of liquid in the reservoir. The float system may comprise a valve system for opening or closing of the liquid inlet of the appliance to enable or disable supply of liquid from the liquid inlet into the reservoir, respectively. For this purpose the float system may contain movable parts, often of a fine mechanical structure, that are responsive to the liquid level in the reservoir and to the resulting position of the float relative to the reservoir.

To establish the desired level of liquid in the liquid reservoir the float system performs several functions of a fine mechanical nature. The float system comprises several components which are of a mechanically fine structure corresponding to these functions. Such components are susceptible to damage which may be caused by vibrations, external forces and the like, which are imposed on the appliance and on the system, e.g. during transport of the appliance from factory to consumer or during transport of the system alone if not yet assembled into the appliance. Damage of the float system may result to a malfunction of the float system, overflow of the liquid reservoir and possibly serious liquid damage to the area which surrounds the appliance.

It is most important that during transport or shipping of the appliance, the float system and its fine mechanisms and particularly components from a valve system are protected against vibrations and external forces to prevent transport damage. For this purpose, the known appliances have a lock for securing and protecting the float system during transport of the appliance. Such a lock is switchable between a first position and a second position.

During activation of the lock, i.e. in the first position, the fine mechanical components of the float system are relieved from vibrations and forces during transport. In the first position the float system is blocked relative to the liquid reservoir. Components of the valve system are relieved from damaging effects of external forces.

The second position of the transport lock is intended to be engaged during use of the appliance. During use or operation of the appliance the float senses a level of liquid which is present in the reservoir. While the actual level of the liquid in the reservoir is below a desired level, the float mechanism acts on the valve system in a way that the liquid inlet is kept open and that liquid is allowed to fill the reservoir. Once the desired level of the liquid in the reservoir is established, the float acts on the valve system such that the liquid inlet is closed. Hence, during use, cooperation between the float and the valve system should be possible and the cooperation may not be hindered or impeded by the transport lock.

During use, the appliance is usually mounted to a stable surface such that its components are not liable to vibrations, external forces and the like. In such a stable situation deactivation of the lock, i.e. captivation of the second position, is appropriate to allow proper functioning of the float mechanism. In such an operational position the appliance may be attached to a wall by means of bolts or the like or to a stable surface under the sink to prevent that shocks or vibrations influence a proper functioning of the fine mechanical components of the appliance.

Frequently, the appliance is supplied with mounting instructions providing specifications for the position of the appliance and the requirements for a mounting surface that may serve as a stable underground to attach the appliance to. For the mounting or installation of the appliance in such an operational position, the appliance may be provided with means of attachment which guarantee a proper fixation of the appliance to the stable underground, i.e. an underground which does not subject the appliance to sudden or extreme vibrations or forces which cause damage to the fine mechanical components of the appliance. Alternatively, instead of being mounted to a wall, the appliance may also be supported in a stable manner by a rig or a stand on a table surface.

However, if a person installing the appliance misses to deactivate the lock by switching the lock from the first position into the second position, said person may be faced with the annoying task of demounting the appliance from the stable mounting surface, the rig or the stand, disassemble the appliance to get access to the lock, deactivate the lock, reassemble the appliance again and repeat the whole mounting procedure to fix the appliance to its stable surface, underground, base or foundation. Such discomfort is often lurking if the installer is not a skilled plumber but e.g. a do-it-yourselfer. It may also occur that the installer is not aware of the necessity to deactivate the lock before use and that the appliance is returned to the supplier under suspicion of improperly functioning.

SUMMARY OF THE INVENTION

It is an object of the invention to provide a liquid appliance of the kind set forth in the opening paragraph which allows efficient installing.

According to the invention this object is realised in that the transport lock is switchable between said first and second positions by an installation prevention element, wherein said element is switchable between a prevention position, wherein installation of the appliance into an operational position is impeded by the element, in which prevention position the first position of the transport lock is established, and an installation position, wherein installation of the appliance into an operational position is unimpeded by the element, in which installation position the second position of the transport lock is established.

According to the invention the first position of the transport lock is associated with the prevention position of the installation prevention element. Hence, installation or mounting of the appliance to a stable underground or surface is not possible when the transport lock fixates the float mechanism. According to the invention the installation prevention element is to be put or switched into its installation position to make accessible the means for fastening the application. The installation position of the installation prevention element corresponds to the second position of the transport lock. In the second position of the transport lock cooperation between the float and the valve system is enabled, because the lock does not impede the cooperation in the second position. In the second position of the lock, the float, which is responsive to a level of liquid in the reservoir, acts on the valve system to open the inlet in case the level of the liquid is low or to close the liquid inlet in case the level of the liquid is as desired. Hence, when mounted or installed into an operational position, the transport lock can not hinder the intended functionality of the float and valve system. Once mounted, the serviceman, the assembler or even the do-it-your-selfer will not be faced with the annoying task of repeating the whole sequence of acts as described above to still disengage the transport lock which was overlooked.

An additional advantage which the invention provides is that the user does not have to touch the transport lock directly. By directly touching the transport lock, the transport lock may become contaminated, e.g. with bacteria or chemicals. As the transport lock may be in direct interaction with the float, the float mechanism or the valve mechanism, these components may also be contaminated by the bacteria and chemicals which may be present at the hands or the tools of the person who installs the appliance. Especially where the appliance is intended for purification of water it is important to avoid every source of contamination of the interior of the reservoir. The components and the transport lock are usually accommodated inside the reservoir. Means for attachment of the appliance into its operational position are outside the reservoir. The installation prevention element interacts with these means for attachment and hence the prevention is accommodated outside the reservoir. According to the invention the transport lock can be switched or operated by handling the installation prevention element. Hence, the transport lock can be operated outside the reservoir by the installation prevention element and exposure of the inside of the reservoir to contamination is avoided while switching the transport lock into the second position.

In an advantageous embodiment of the invention the element has a portion which, in the prevention position of the element, extends into a region of the appliance for accommodating fastening means.

Such fastening means may comprise a stable surface to which the appliance is mounted. Such fastening means may also comprise bolts, screws, adhesives and the like. Such fastening means may also refer to a rig or a stand for stable positioning of the appliance to a table surface. A face of the appliance may for example be mounted to a stable surface such as provided by a kitchen wall or a kitchen cabinet or kitchen shelves. Around the mounting face of the appliance is a region which is occupied by for example the wall or a portion of the stable mounting surface to which the appliance is mounted. In that case a portion of the mounting region of the appliance is outside the appliance where the stable surface is positioned relative to the appliance. Fastening means such as bolts or screws which connect the appliance to the stable surface may also be present. Such fastening means may run through a hole provided in the mounting face of a wall portion of the appliance or an extension thereof. For example a head portion of such a bolt or a screw and a rivet may be positioned within the mounting region between the head portion and the mounting face to clamp a wall portion of the appliance between the head portion and the stable mounting surface. The mounting region then also comprises the space which is occupied by the head portion of the bolt or screws and the rivet. The mounting region being occupied in operational position of the appliance, the said portion of the installation prevention element cannot be put or switched into the mounting region when the appliance is in the operational position in the prevention position. It is thus impossible that the user reactivates the transport lock once the application is mounted.

In an advantageous embodiment of the invention the installation prevention element is switchable between the prevention position and the installation position by a rotation of the installation prevention element around an axis of rotation.

Fastening means such as bolts, screws have an orientation along a longitudinal axis. During installation of the appliance the installation prevention element or mount prevention should preferably hinder the manipulation of such oblong fastening means in a direction along their length axis. The axis of rotation enables that the installation prevention element can be turned away from a manipulation path which is needed to comfortably position such oblong fastening means. If the installation prevention element is switchable by a translation of the installation prevention element—contrary to the preferred rotation—along a switching path, sufficient length of the path should be anticipated to enable manipulation of fastening means of a certain length. If the material of the stable wall surface is of a quality which requires relatively long bolts such as a wall of a soft material, the required switching path may have a considerable length to allow manipulation of relatively long bolts or screws which are required to attach the appliance to the soft wall material.

In a preferred embodiment the installation prevention element is secured to the transport lock, wherein the transport lock is eccentrically arranged in respect of the axis of rotation.

Both the mount prevention or installation prevention element and the transport lock may be attached to a spindle or a shaft which is rotatably arranged to the reservoir by bearing means. Such a construction can be produced in a cost-effective and reliable way. Such an embodiment is producible by injection moulding, wherein the transport lock and the installation prevention element can be realised in a monolithic structure.

In a further preferred embodiment the transport lock is provided with a lock surface which cooperates with a surface of the float when the transport lock is switched to the first position.

Such a construction enables that the transport lock engages with the surface of the float under pretension or pressure. The pretension has the effect that the transport lock and the float are in a force closed state when the transport lock is engaged. Such a force closed state prevents that components rumble against each other during transport of the appliance in their locked position as a result of tolerances of components or for example backlash between components.

In yet another embodiment according to the invention a lever system is pivotably arranged in respect of the reservoir, wherein the valve system comprises a valve member for cooperation with a valve seat, wherein the valve member is forced into a closed position against the valve seat by a resilient element when the transport lock is switched to the first position, wherein transmission of forces from the float via the lever mechanism are prevented by a gap between the valve and the lever mechanism.

To enable cooperation between the lever and the valve system a pivotable arrangement is used. The gap between the valve and the lever mechanism prevents that the valve rumbles or rattles against its seat during transport. Such an impact of the valve body against its seat may damage these vulnerable components. The resilient body now has the function to hold the valve against its seat. No inertia forces are transmitted in the transport position of the lock from the float and lever system to the valve system or vulnerable parts thereof such as a valve stem or the accurate surfaces of the valve and valve seat which provide liquid.

Packaging material for a water appliance can be designed such that the packaging material has a form to keep the installation prevention element into the prevention position when packed by the packaging material. The function of packaging material in this respect may also be fulfilled by a provision on for example the housing of the appliance to provide a fixation of the transport lock to the housing.

BRIEF DESCRIPTION OF THE DRAWINGS

These and other aspects of the liquid appliance, the transport lock, the installation prevention element, the float system and the packaging material of the invention will be further elucidated and described with reference to the drawings, in which.

DETAILED DESCRIPTION OF THE EMBODIMENTS

Figure 1:
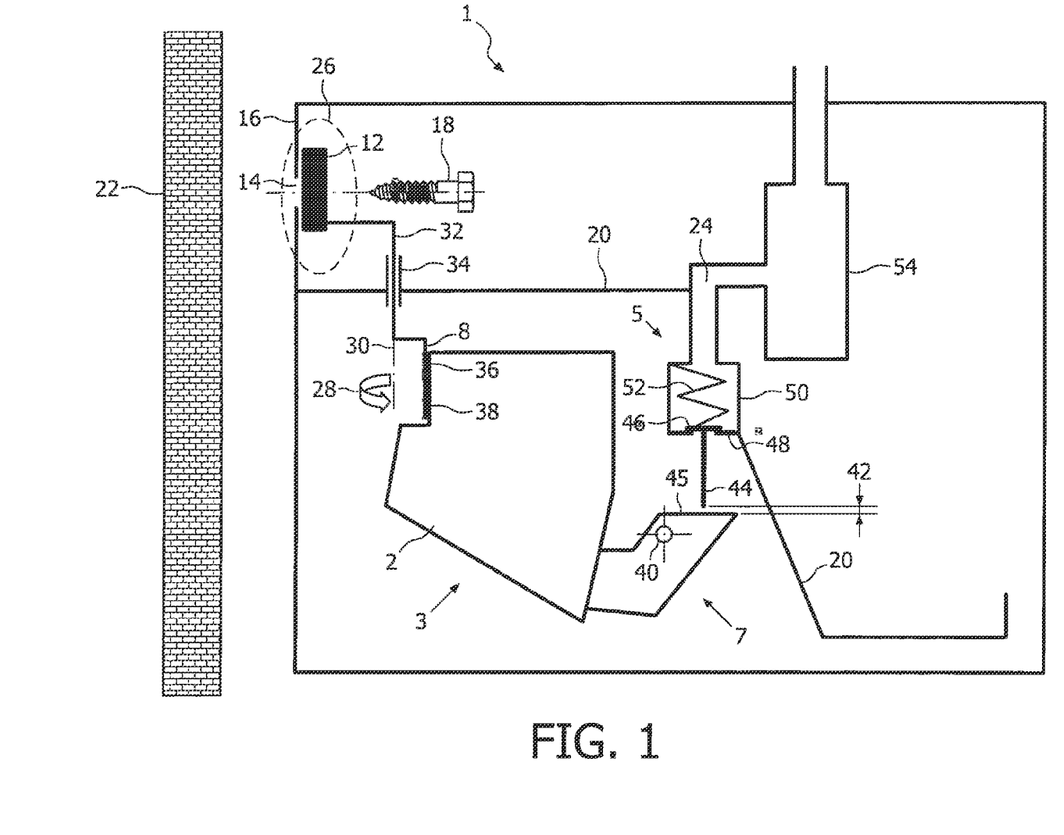
FIG. 1 is schematic view of an embodiment according to the invention.
Figure 2:
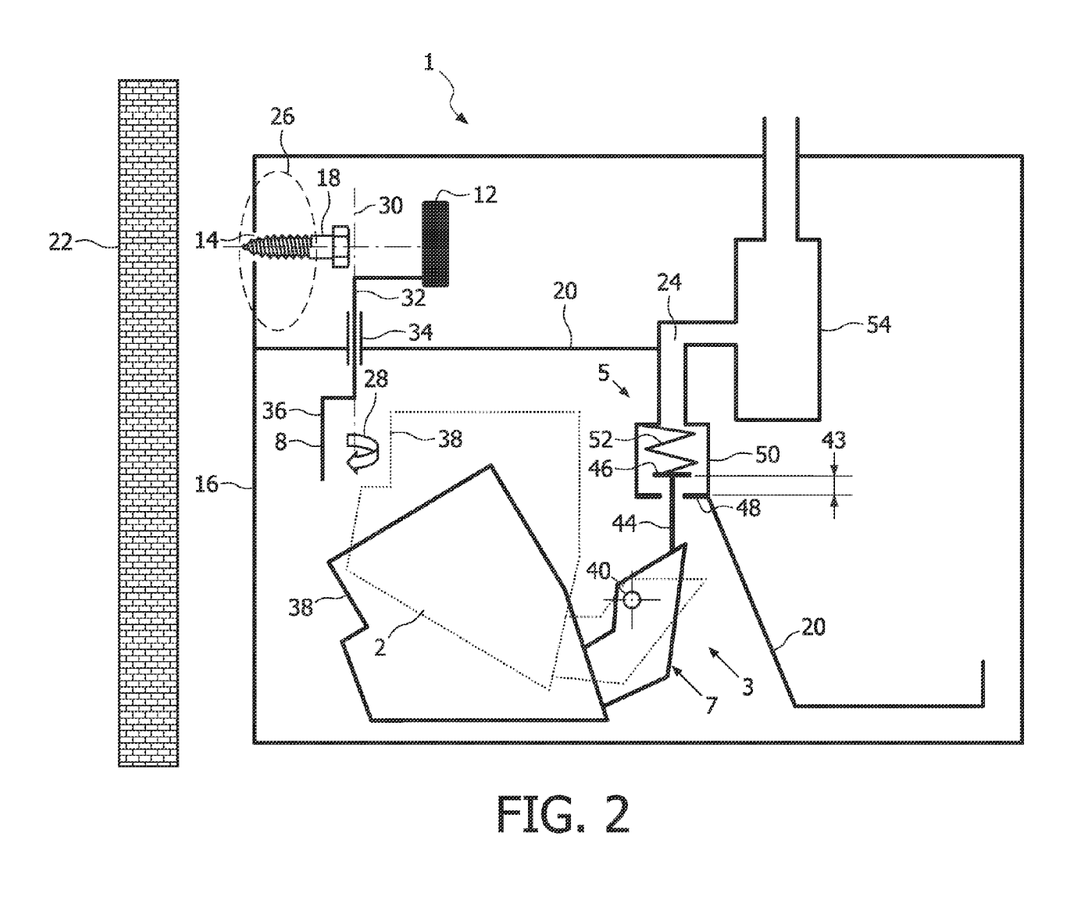
FIG. 2 is a schematic view of the embodiment as depicted in FIG. 1.

FIG. 1 schematically depicts a liquid appliance 1. The appliance has a liquid reservoir 20 which is provided with a liquid inlet 24. Via the inlet 24 liquid is supplied to the reservoir 20. A float system 3 is arranged inside the reservoir 20. The float system 3 has a float 2 and a valve system 5. A transport lock 8 is switchable between a first position as depicted in FIG. 1 and a second position as depicted in FIG. 2. In the first position (FIG. 1) the transport lock 8 blocks the float system 3 relative to the liquid reservoir 20. The transport lock 8 can be switched from the first position (FIG. 1) to a second position (FIG. 2) by an installation prevention element 12. The installation prevention element 12 can be switched between a prevention position as depicted in FIG. 1 and an installation position as depicted in FIG. 2. In the prevention position (FIG. 1) the installation prevention element 12 blocks a opening 14 in a wall 16 of the appliance 1. A threaded bolt 18 is prevented from being driven or screwed into a wall 22. Hence, in the first position of the transport lock and the corresponding prevention position of element 12 (FIG. 1), installation of the appliance 1 into an operational position is impeded by the element 12.

The installation prevention element 12 has a portion which, in the prevention position of the element, extends into a region 26 of the appliance for accommodating fastening means. In FIG. 1 this region is indicated by a dashed oval near hole 14.

The mount prevention or installation prevention element 12 is switchable between its prevention position and its installation position by a rotation, indicated by an arrow 28, of the mount prevention around an axis of rotation 30. The installation prevention element 12 is secured to the transport lock 8 by means of a shaft 32. The transport lock 8 is eccentrically arranged in respect of the axis of rotation 30. Hence, turning away the element 12 will simultaneously remove the transport lock 8. Shaft 32 is guided by a bearing 34. The shaft 32 and the bearing 34 constituting a connection from the interior of the reservoir 20 to the exterior of the reservoir 20 a de-aeration of the reservoir 20 may be advantageously integrated into the connection as provided by shaft 32 and bearing 34. The de-aeration may be also engaged at the moment of switching the installation prevention element. This has the advantage that the de-aeration is only opened at installation of the appliance. Blockage of the de-aeration by contamination, e.g by little spiders and dust and the like, during storage is than prevented.

The transport lock 8 has a lock surface 36 which presses against a corresponding surface 38 of the float 2 when the transport lock 8 is switched to the first position.

A lever system 7 is pivotably arranged in respect of the reservoir 20. The lever system 7, which is secured to the float 2, is pivotable around a pivot centre 40. In the situation as depicted in FIG. 1 a gap 42 is present between a valve stem 44 and a surface 45 of the lever system 7. Hence, no forces will be introduced to the valve stem 44 and the valve system 5 from the lever system 7. The valve system 5 has a valve member 46 and a valve seat 48. The cooperation between the valve member 46 and the valve seat is enabled when the transport locked is in a position as depicted in FIG. 2. Inflow of liquid and specifically water through inlet 24 from a processing unit 54, e.g. a water purification unit such a water filter, is regulated by the valve system 5.

The valve member 46 is forced into a closed position against the valve seat 48 by a resilient element 52, e.g. a coil spring in case the transport lock 8 is switched to the first position.

In the remainder of the description like numerals are used to indicate similar components. In FIG. 2 the appliance 1 is shown in a position, wherein the transport lock 8 does not impede a pivoting motion of the float 2. The float is sensitive to a level of liquid which is present inside the reservoir during use of the appliance 1. Now the float system is released from blockage by the transport lock 8 to enable cooperation between the float 2 and the valve system 5 for opening and closure of the water inlet 24 to establish a predetermined level of water in the reservoir during use of the appliance. The transport position or locked position of the float is indicated in dotted lines. In this second position of the lock surfaces 36 and 38 are not in contact. The interaction between the lever system and the valve system enables a valve elevation 43 which is dependent on the position of the float 2 relative to the reservoir.

Figure 3:
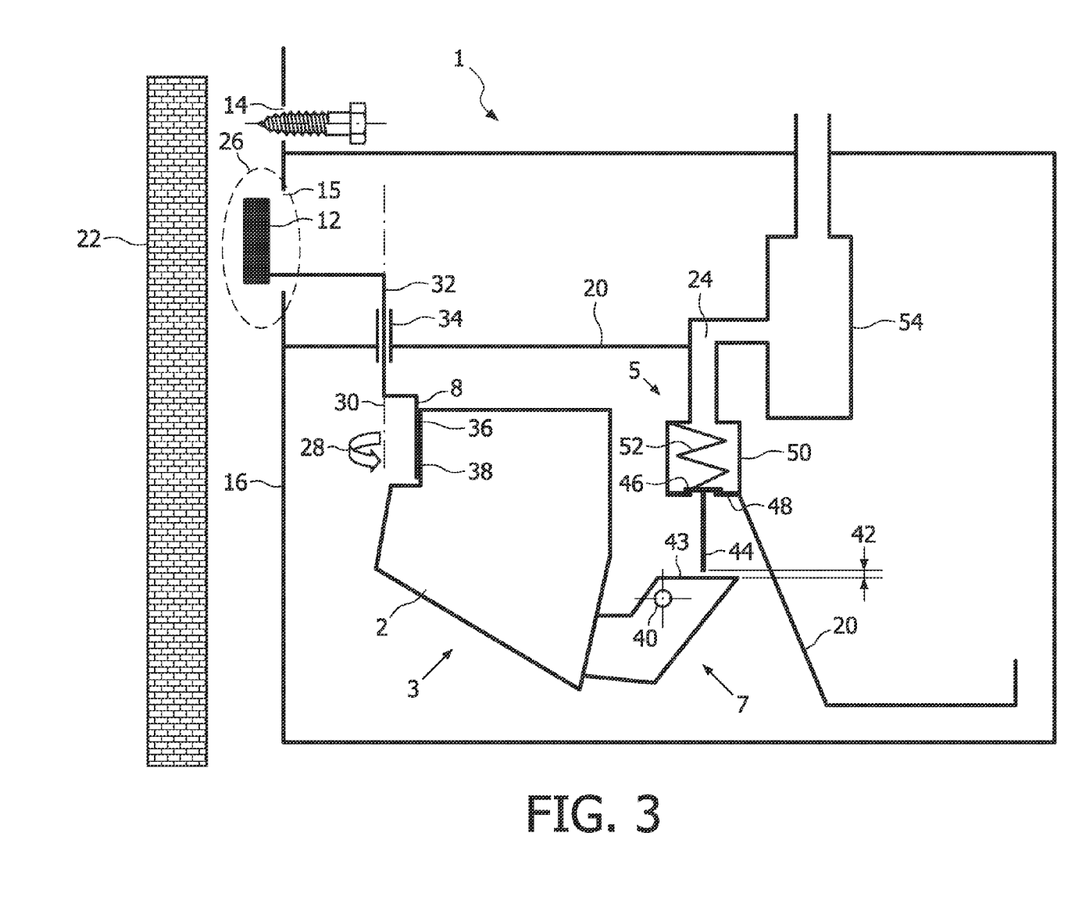
FIG. 3 is a schematic view of an embodiment according the invention.

In FIG. 3 the installation prevention element 12 is situated in the prevention position in a region 26 which extends outside a wall 16 of the appliance 1. Fixing the appliance to wall 22, whereby wall 16 comes close to a stable surface as provided by wall 22, is not possible unless the element 12 is turned away. If turned away, the transport lock is released and the valve and float system enable the establishment of a desired level of the liquid or water inside the reservoir.

Figure 4:
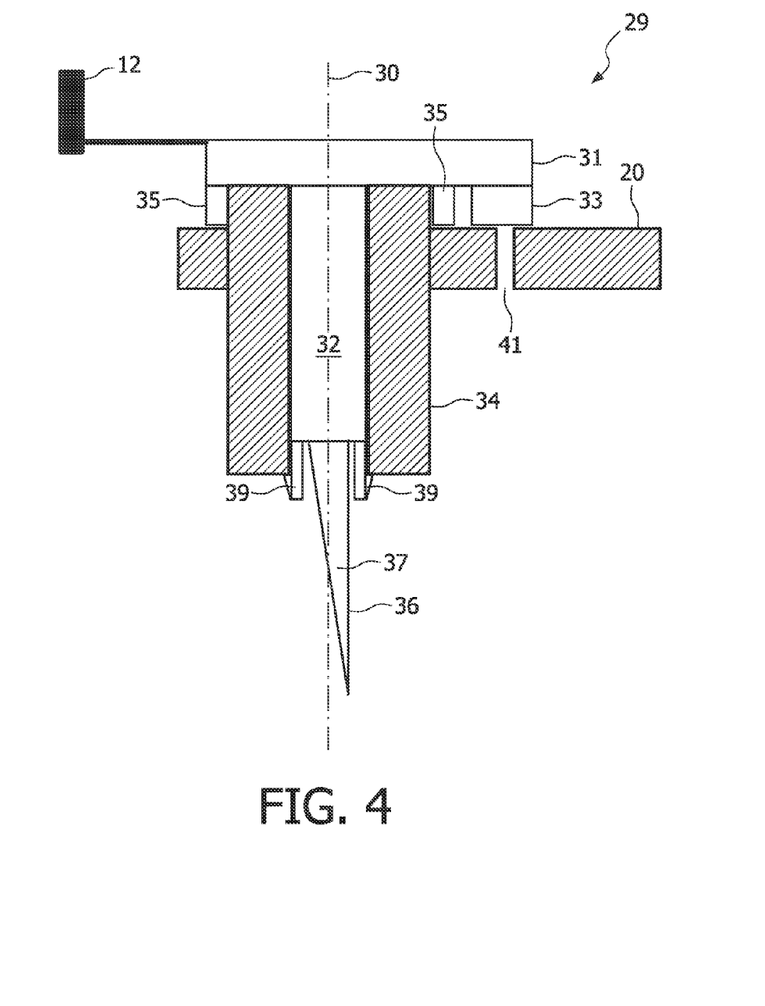
FIG. 4 is a schematic view of a detail of an embodiment according to the invention.

In FIG. 4 a monolithic structure 29 is schematically depicted. The structure 29 can be produced by injection moulding in a cost-effective manner. The structure 29 comprises an installation prevention element 12, a cover part 31, a cover ring 35, a de-aeration block 33, a shaft 32, an extension 37 which has a lock surface 36 and resilient snap-fit or snap-lock members 39. The structure 29 can be inserted into the bearing 34. During insertion of the structure into the bearing 34 the snap-fit elements 39 are slightly bent inwards towards the axis of rotation 30. After being completely inserted into the bearing 34 the elements 39 snap around the edges provided by bearing 34 and the structure 29 is secured into its bearing 34. The cover part 31 and the cover ring 35 prevent that unpurified water can enter the reservoir during installation of the appliance via an interspace between bearing 34 and shaft 32. To allow a proper establishment of a desired level of water inside the reservoir 20, a de-aeration hole 41 is provided in the reservoir 20. The de-aeration hole 41 is covered in the prevention position by the de-aeration block 33 which is included into the monolithic structure. In the installation position, when the structure 29 is turned around axis 30, the de-aeration hole is open. Thus, the de-aeration block 33 prevents, that contamination, small spiders, dust and the like, enter the inside of the reservoir in the prevention position of the installation prevention element 12.

Figure 5:
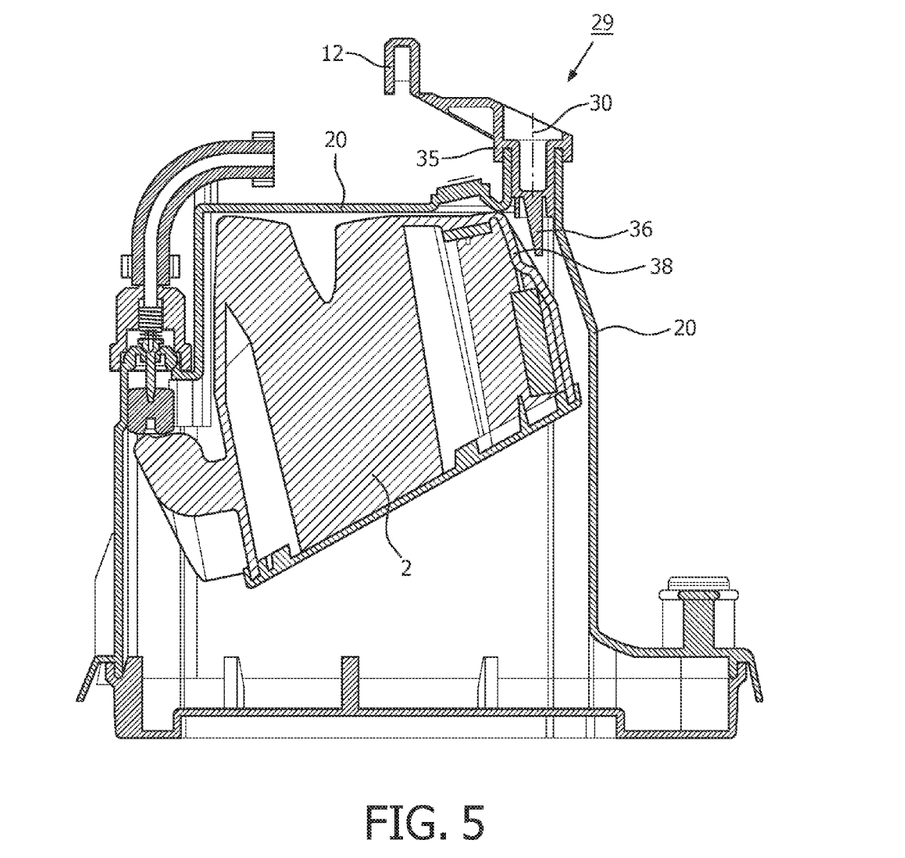
FIG. 5 is a schematic view of a detail of an embodiment according to the invention.

In FIG. 5 an embodiment of a monolithic structure 29 of a transport lock according to the invention is depicted. In FIG. 5 an installation prevention element 12 is depicted in an installation position. In the installation position surfaces 36 and 38 are not in contact and hence a float 2 is not restricted by a locking cooperation between these surfaces 36 and 38. FIG. 5 shows how cover ring 35 can be integrated into an injection moulded part 29.

While the invention can be very advantageously applied for water purifiers which make use of a reservoir that is automatically filled by the main water supply, it can also be advantageous to implement the invention in any appliance that makes use of a float mechanism which needs to be protected during transport or from the detrimental influence of external forces or vibrations. While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the mounting or installation prevention element takes in the space which is intended for e.g. a waterpipe or an electrical socket connection or an electrical switch to prevent installation of an appliance which has an unreleased transport lock.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A liquid appliance having
a liquid reservoir,
a liquid inlet for supplying liquid to the liquid reservoir,
a float system having a float and a valve system,
a transport lock switchable between a
   first position in which the transport lock blocks the float system relative to the liquid reservoir, and
   a second position in which a cooperation between the float system and the valve system for opening and closure of the liquid inlet is unimpeded by the transport lock,
wherein the transport lock is switchable between said first and second positions by an installation prevention element that is secured to the transport lock, wherein said installation prevention element is switchable between
a prevention position, wherein an installation of the appliance into an operational position is impeded by the installation prevention element, in which the prevention position the first position of the transport lock is established, and
an installation position, wherein an installation of the appliance into an operational position is unimpeded by the installation prevention element, in which an installation position the second position of the transport lock is established
wherein the installation prevention element is switchable between the prevention position and the installation position by a rotation of the installation prevention element around an axis of rotation, and
wherein the transport lock is eccentrically arranged with respect to the axis of rotation.

2. The liquid appliance according to claim 1, wherein the element has a portion which, in the prevention position of the element, extends into a region of the appliance for accommodating fastening means.

3. The liquid appliance according to claim 2, wherein the transport lock is provided with a lock surface which cooperates with a surface of the float when the transport lock is switched to the first position.

4. The liquid appliance according to claim 1, wherein a lever system is pivotably arranged in respect of the reservoir, wherein the valve system comprises a valve member for cooperation with a valve seat, wherein the valve member is forced into a closed position against the valve seat by a resilient element when the transport lock is switched to the first position, wherein transmission of forces from the float via the lever mechanism are prevented by a gap between the valve and the lever mechanism.

5. A transport lock for use in a liquid appliance, the liquid appliance having,
a liquid reservoir,
a liquid inlet for supplying liquid to the liquid reservoir,
a float system having a float and a valve system,
a transport lock switchable between a first position in which the transport lock blocks the float system relative to the liquid reservoir, and
a second position in which a cooperation between the float system and the valve system for opening and closure of the liquid inlet is unimpeded by the transport lock,
wherein the transport lock is switchable between said first and second positions by an installation prevention element that is secured to the transport lock, wherein said installation prevention element is switchable between
a prevention position, wherein an installation of the appliance into an operational position is impeded by the installation prevention element, in which the prevention position the first position of the transport lock is established, and
an installation position, wherein an installation of the appliance into an operational position is unimpeded by the installation prevention element, in which an installation position of the second position of the transport lock is established,
wherein the installation prevention element is switchable between the prevention position and the installation position by a rotation of the installation prevention element around an axis of rotation, and wherein the transport lock is eccentrically arranged with respect to the axis of rotation.

6. An installation prevention element for use in a liquid appliance, the liquid appliance having,
- a liquid reservoir,
- a liquid inlet for supplying liquid to the liquid reservoir,
- a float system having a float and a valve system,
- a transport lock switchable between a first position in which the transport lock blocks the float system relative to the liquid reservoir, and
- a second position in which a cooperation between the float system and the valve system for opening and closure of the liquid inlet is unimpeded by the transport lock,
- wherein the transport lock is switchable between said first and second positions by an installation prevention element that is secured to the transport lock, wherein said installation prevention element is switchable between
- a prevention position, wherein an installation of the appliance into an operational position is impeded by the installation prevention element, in which the prevention position the first position of the transport lock is established, and
- an installation position, wherein an installation of the appliance into an operational position is unimpeded by the installation prevention element, in which an installation position of the second position of the transport lock is established,
- wherein the installation prevention element is switchable between the prevention position and the installation position by a rotation of the installation prevention element around an axis of rotation, and wherein the transport lock is eccentrically arranged with respect to the axis of rotation.

7. A float system for use in a liquid appliance, the liquid appliance having,
- a liquid reservoir,
- a liquid inlet for supplying liquid to the liquid reservoir,
- a float system having a float and a valve system,
- a transport lock switchable between a first position in which the transport lock blocks the float system relative to the liquid reservoir, and
- a second position in which a cooperation between the float system and the valve system for opening and closure of the liquid inlet is unimpeded by the transport lock,
- wherein the transport lock is switchable between said first and second positions by an installation prevention element that is secured to the transport lock, wherein said installation prevention element is switchable between
- a prevention position, wherein an installation of the appliance into an operational position is impeded by the installation prevention element, in which the prevention position the first position of the transport lock is established, and
- an installation position, wherein an installation of the appliance into an operational position is unimpeded by the installation prevention element, in which an installation position of the second position of the transport lock is established,
- wherein the installation prevention element is switchable between the prevention position and the installation position by a rotation of the installation prevention element around an axis of rotation, and wherein the transport lock is eccentrically arranged with respect to the axis of rotation.

\* \* \* \* \*